United States Patent
Cerny, Jr.

[11] Patent Number: 5,395,206
[45] Date of Patent: Mar. 7, 1995

[54] METHOD AND APPARATUS FOR FILLING ORDERS IN A WAREHOUSE

[76] Inventor: Louis J. Cerny, Jr., 9910 Partridge Tr., Kirtland, Ohio 44094

[21] Appl. No.: 852,561

[22] Filed: Mar. 17, 1992

[51] Int. Cl.$^6$ .............................................. B65G 1/04
[52] U.S. Cl. .................................. 414/786; 414/276; 414/273; 414/270; 414/271; 364/478
[58] Field of Search ............... 414/786, 276, 273, 274, 414/266, 267, 268, 269, 270, 272, 331, 271; 364/478

[56] References Cited

U.S. PATENT DOCUMENTS

| | | | |
|---|---|---|---|
| 4,088,237 | 5/1978 | Brown | 414/270 X |
| 4,527,937 | 7/1985 | Tomassello, Jr. | 414/276 X |
| 5,024,572 | 6/1991 | Tanaka et al. | 414/276 |

FOREIGN PATENT DOCUMENTS

| | | | |
|---|---|---|---|
| 180506 | 11/1982 | Japan | 414/276 |
| 82201 | 5/1984 | Japan | 414/276 |
| 47202 | 2/1988 | Japan | 414/273 |
| 81704 | 3/1989 | Japan | 414/273 |
| 242304 | 9/1989 | Japan | 414/273 |
| 8909737 | 10/1989 | WIPO | 414/268 |

Primary Examiner—Frank E. Werner
Attorney, Agent, or Firm—George J. Coghill

[57] ABSTRACT

A system for filling orders in a warehouse utilizes a main conveyor for routing items in the warehouse, including to a primary and secondary picking area. The primary picking area is used for picking high volume items, and is subdivided into multiple subgroups of primary pick faces. The second picking area is used for picking items that are not available for picking in the first picking area. Picking is performed in alternating short pick periods. Picking from a first subgroup of primary pick faces is performed in a first pick period, and picking from the second subgroup of primary pick faces is performed in an alternating pick period. Items are assigned to the first picking area dynamically for each picking period on the basis of which items are the highest moving items during an individual pick period. The system utilizes a pivotally mounted diverting chute to direct items into the pick faces, etc., and a self opening pick face.

18 Claims, 3 Drawing Sheets

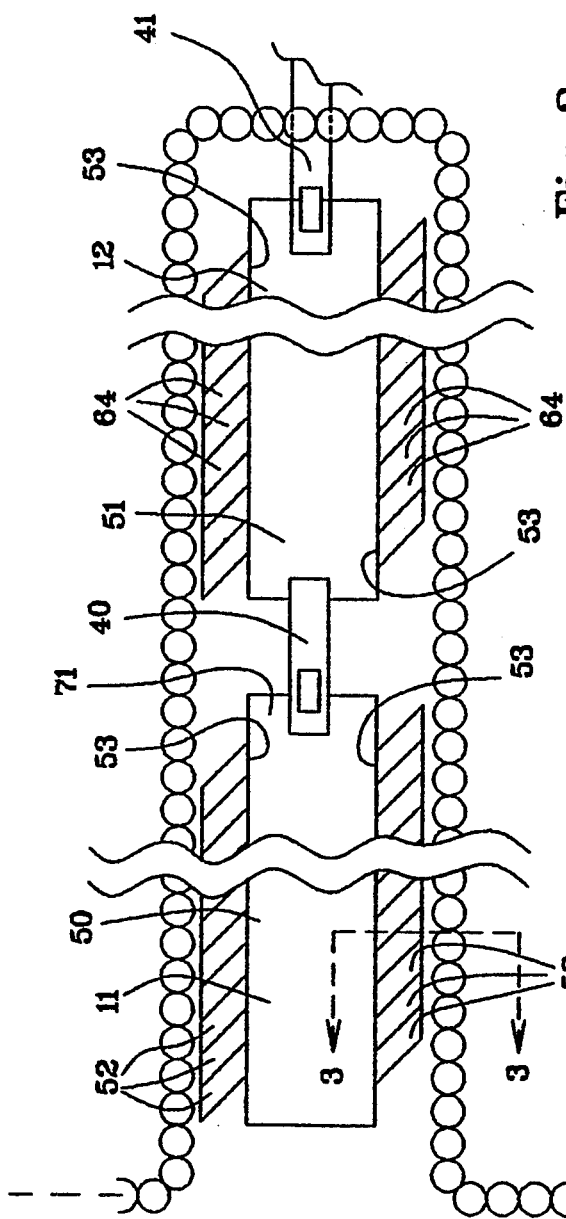
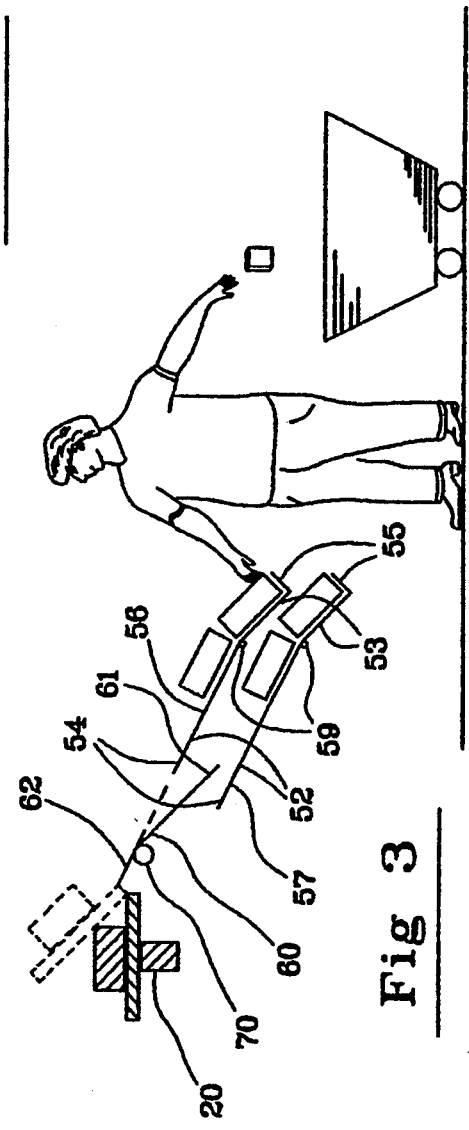
Fig 2
Fig 3

METHOD AND APPARATUS FOR FILLING ORDERS IN A WAREHOUSE

FIELD OF THE INVENTION

This invention relates generally to the field of warehouse distribution systems, and relates more particularly to a method and apparatus for fulfilling orders from stock in a warehouse and subsequent shipment to other locations.

BACKGROUND OF THE INVENTION

Warehousing operations can encompass a large number of different items in storage awaiting shipment to many different possible locations. It is common practice to refer to the same type of item in a warehouse as a "sku" which is an acronym for "stock keeping unit". Thus, as used here, the term "sku" is used to refer to an individual type of item. That is, although there may be many of the same type of item in a warehouse, they will all be kept track of by the same sku designation, since they are all supposed to be "identical" products or goods.

In a typical warehouse operation, items in storage may, for example, be needed for shipment to many customers, shipments to other plants, or shipments to other locations at the same plant but at a different work station. Sometimes an individual shipment might involve only one item for a particular destination, or several of the same item, but more typically, especially in the case of filling orders for a customer, would involve one or more of several different items or sku's going to a particular location. This process would necessarily then be repeated each day on a continuing basis for many different customers and locations. For example, a clothing manufacturer may have many different product lines, and within each line, many different styles, sizes, colors, etc. Any one customer may order several different items from the various product lines, sizes, colors, styles, etc., and this would be true for each of a manufacturer's many customers.

Thus, it should be apparent that the items needed for shipment at any one particular time may be very different from one day to the next, or even from one hour to the next.

The assembly of items for shipment can thus be a complicated matter, especially if it is to be done on a cost effective basis. Manpower requirements, shipping charges, the physical space requirements needed to carry on the operation, capital investment, and the turn-around time needed to complete shipments all need to be kept as low as possible. In order to optimize these factors and their related expenses, various equipment and operating systems have been used. For example, it is known that by consolidating items for shipment to each particular destination, shipping costs can be reduced, as long as the cost of consolidating the items does not exceed the savings. Thus, it is important that a warehouse have a cost effective mechanism to consolidate from the whole inventory of goods, all of the items currently on order for shipment to each of their particular destinations. Various conveyor systems and operating systems have been utilized to automate warehouse operations, but generally involve the need for more space and more capital investment.

Typically in the past, stored items were kept in a particular dedicated location. A particular item or sku was stored in its own location or storage bin on a substantially permanent basis. To fill and order, a worker (called a "picker") was given a "pick slip" or "packing slip" which listed all of the items needed to fill a particular order. In some systems the pick slip is an electronic or other signaling device used to indicate to a picker which items to pick for filling an order.

Depending on the nature of the item(s) being stored, a particular item may be in a bin, or tray, or rack, or simply on a pallet. Whatever type of storage device is used, it is generally referred to as a "pick face". When an item was needed to fill an order, a picker would travel to the particular pick face, possibly with a cart, and manually "pick" the needed number of items from that location, and add the item(s) picked to the particular order being filled. If many different items were needed for shipment to a particular destination, the picker had to travel to the pick face for each of the different items needed. This process was a time consuming process.

Also with regard to the picking areas, and in particular with regard to the configuration and layout of the pick faces, it has always been desirable to minimize, as much as possible, the physical space required for the pick faces and the overall picking area itself so as to reduce the time required for a picker to travel the pick area and reduce the physical plant required to house the picking area, but still allowing enough room between pick faces to conveniently remove items from the pick face.

In order to speed the process today, many warehouses utilize conveyor systems with automatic diverters under automatic computer control. Some systems for example use computers in conjunction with various types of sensors or scanners that keep track of individual items on a conveyor, the location of the item along the conveyor, a prioritized destination of that item, etc. The sensors or scanners are placed at various locations along the conveyor route to automatically read or detect various types of information. In some applications, optical sensors are used, while in other applications, weight sensors, magnetic sensors, or some other appropriate type of sensor is used to detect and/or identify items on the conveyor. In still other systems, scanners are used to read coded machine-readable labels on the items, so as to update and check on the various system parameters, item location, and other data, on a constant basis, and to provide feedback for the purpose of correctly and automatically activating diverters to route packages and other items to their proper destination within the warehouse.

The conveyors have taken various forms. Some have been simple belt or roller conveyors, while others have individual trays for individual items or cartons of items, and are well known to those skilled in the art.

Diverters have been developed into many forms. Some systems have used "push" levers or arms, or pop-up wheels that are operated under solenoid, pneumatic, or other automatic control, to automatically direct individual or multiple items from one conveyor to another, or into chutes, storage bins, etc. Still other systems have devised diverting systems comprised of individual tiltable trays on a continuous conveyor track under computer or other automatic control. This latter type of automatic diverter system, while somewhat new, is now well known in the art.

As noted, the tilt tray type conveyor generally comprises a continuous series of individual trays riding on a conveyor track. Each tray is capable of being tilted at an angle to the direction of travel of the conveyor track, such that when an individual tray is tilted, its contents slides off of the tray (at a predesignated location), again for example, onto a chute or onto another conveyor leading to a storage bin, etc. The operation of the "tilt"-able tray systems is such that the trays are tilted while the conveyor is moving, but the timing of the tilting is selected such that the item on the tray accurately arrives at its intended destination.

In another tray type conveyor, each of the trays has an automatic belt mechanism on its upper surface which can be automatically activated to eject its contents off of the tray at an angle to the direction of the conveyor travel, again, with proper controlled timing, into a chute, bin, etc.

The operation and control of such tilt-tray, or belt diverting tray type conveyors, generally involves complex computer control, but this aspect of the warehousing operation is well known in the art and need not be discussed in detail here. Other conveyor systems and diverter systems are known as well.

But even with the advent of computers, the assembly of orders still involves, on a large basis, the use of human workers assisting, to a greater or lesser degree, the automated system(s) being used. And, other warehouse operations are still by and large manually conducted with the simplest type of belt, wheel, or roller type conveyor, with workers manually transferring items from one conveyor to another, from a conveyor into a storage bin, etc., or possibly without the use of a conveyor at all.

SUMMARY OF THE INVENTION

The present invention comprises a method and apparatus for increasing the efficiency of filling orders from a warehouse operation or the like, where different items of goods are to be consolidated together from a storage means for stock and transport of such items together to other locations. Typical examples comprise the traditional shipments to customers, transfers of raw materials or other goods to a different work station in a manufacturing plant, etc. Various ones of the inventive aspects are usable with manual systems, conveyor based systems, and systems with or without automatic diverters, scanners, and various levels of computer control.

According to one aspect of the present invention, it has been found that in most warehouse operations for filling orders to customers, manpower and space requirements can be reduced by splitting up the area where goods are picked. In many typical operations, approximately 80% of the goods picked during any given period comprise approximately 20% of the sku's in the warehouse. These percentages are not firmly fixed figures, but represent approximate percentages for typical operations. In some operations, these numbers may be different, but in general there is a certain small fraction of the sku's that represent a majority of the items being ordered and shipped during any given period. In some cases, these high volume items may be the same, by and large, all of the time. However, in a more typical situation, these high volume items change from period to period. Even though the particular make-up of this "high volume" group may change from period to period, as a general guideline, it has been found that for any given period, some smaller subclass of the entire inventory will constitute the majority of the items required for shipments during that period.

The present invention comprises a method and apparatus for picking items to fill orders. The disclosed system utilizes multiple alternating picking periods, multiple picking areas, a dynamic alternating assignment of inventory items to predetermined pick faces, and other details as will be described in greater detail hereinafter.

In one aspect of the invention, picking is divided into somewhat short "pick periods", e.g. 20 minutes to approximately 2 hours.

Picking is conducted from two or more picking areas within the warehouse, each having a predetermined sku (or type of item) assigned to it. A primary picking area is used for picking the high volume sku's during a picking period, and a secondary area (or areas) are used for picking the remainder of the sku's to be shipped during that period.

In another inventive aspect of the system, the storage bins for the high volume items are dynamically assigned for each individual picking period. In more particular, for each picking period, the highest volume sku's are determined by computer analysis (or otherwise) for that period, and these items are taken to the primary picking area by automatic conveyor or by other means for picking.

In another inventive aspect of the system, the primary pick area comprises two or more sets of pick faces. While picking is being conducted from one set of pick faces, the remaining pick faces are stocked for a subsequent pick period.

In still another aspect of the invention, a single master conveyor is used for all routing of goods in the warehouse.

In still another inventive aspect, the system comprises a novel inclined storage bin means with a pivoting lower end to make pick faces more accessible to pickers.

A novel diverter is disclosed to controllably direct items to multiple pick faces at different elevations.

Although, computer control of the system and automatic diverters are beneficial to taking full advantage of the invention, many, if not all, of its advantages can be realized even in a manual warehouse operation without computer control.

BRIEF DESCRIPTION OF THE DRAWINGS

The invention can be more fully understood by reference to the following Description of the Invention in conjunction with Drawings in which:

FIG. 2 is a partial plan view of the warehouse layout of FIG. 1, showing a conveyor, a primary high volume pick area; and a secondary pick area;

FIG. 3 is a cross-sectional view of the primary high volume pick area of FIG. 2 taken on the plane marked 3—3 in FIG. 2.

DESCRIPTION OF A PREFERRED EMBODIMENT

For purposes of description, the system is described in terms of a warehouse adapted to fill orders to customers where any particular customer may order only one item, but more typically will order more than one item, and in fact will typically order one or more of many different items, to be delivered in one shipment.

Figure 1:
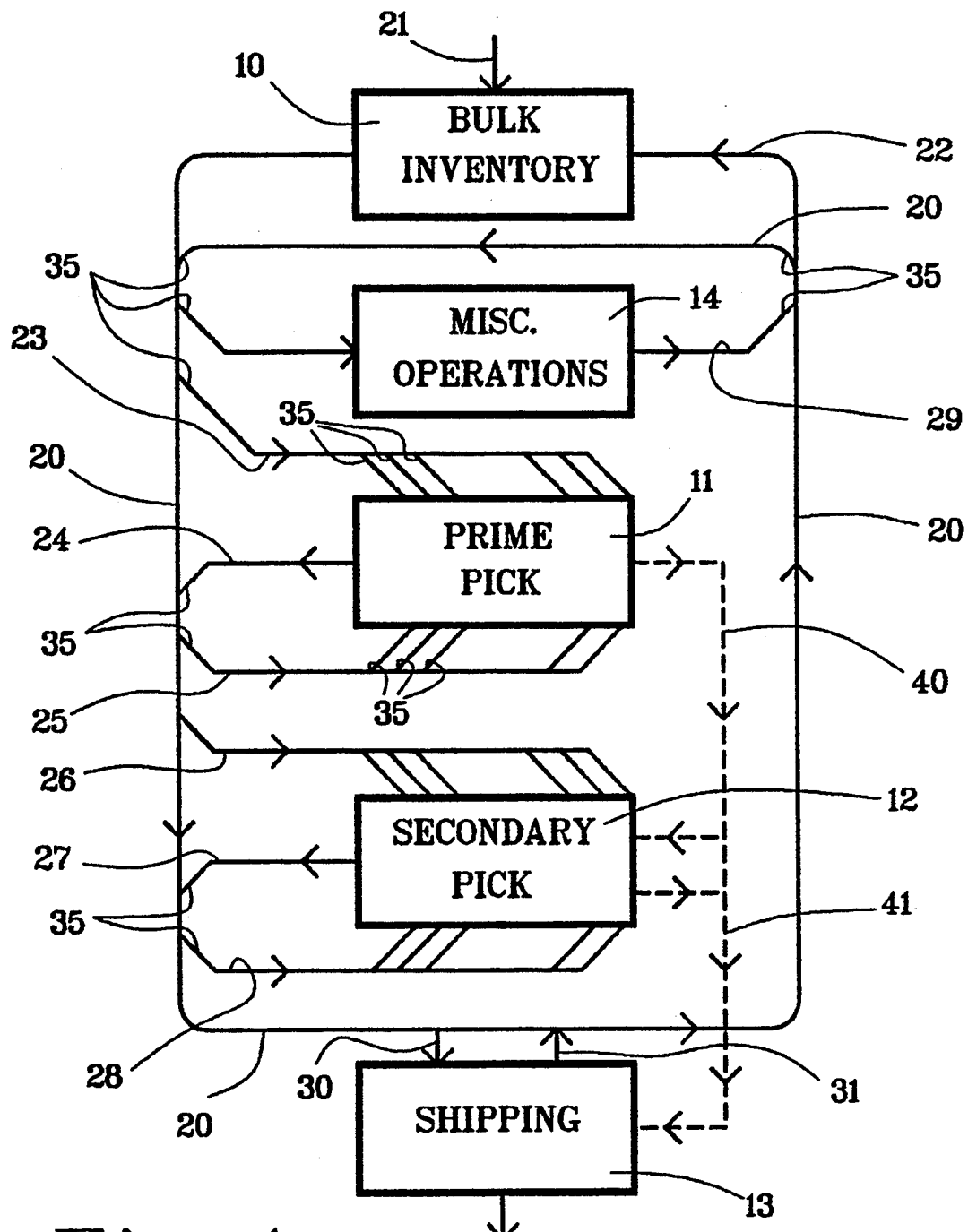
FIG. 1 is a block diagram of a preferred general flow pattern of items in a warehouse system according to the invention.

The block diagram of FIG. 1 shows the general flow of items in the warehouse to and from its various functional areas comprising: a bulk storage area 10, a primary high volume pick area 11, a secondary pick area 12 in addition to the primary pick area 11, a shipping area 13, and a "misc. operations" area 14. Diagramatically it shows by means of arrow designations the flow of stored goods between the various areas during typical operation. FIG. 1 represents more of a flow chart of the system rather than an actual physical layout. In this preferred embodiment, it is contemplated that the material flows through the system by means of automatic, computer assisted conveyors 20, but the flow could be accomplished manually by workers.

Bulk storage area 10 comprises one or more locations where inventory is stored on a more or less long term basis until needed at some other location, such as to stock or replenish picking areas, etc. This is the traditional "stock" storage for inventory. As depicted by the arrow 21, items are received from a receiving dock, manufacturing, etc. (not shown), and added to stock. As is typical of warehouse operations, similar items are kept together in bins, racks, on pallets, etc.

Miscellaneous operations 14 might represent special modifications of items, price ticketing, repairs to damaged inventory, etc.

The prime picking area 11 and the secondary picking area 12 are locations within the warehouse where items of inventory are taken and kept in bins or trays, or other type of pick faces, and where pickers go to select or pick appropriate items so as to consolidate items together when filling orders. These two pick areas 11 and 12 will be described in greater detail below.

Items can be moved between the various areas by known conveyor means 20. The conveyor means 20 can be comprised of a main route (around the periphery of the operation as depicted in FIG. 1) and various side path conveyors 22 through 31 that lead to the different areas, and also to various specific locations within areas. Alternatively, the conveyor 20 can comprise a single conveyor, winding, if necessary, through all of the various functional areas of the warehouse. Known diverting and merging means 35 can be utilized at the junctions of the main conveyor 20 and the side path conveyors 22-31 so that each item on the conveyor 20 can be selectively directed to either continue on its present path, or be diverted to another conveyor, bin, chute, etc.

In an automatic computer based system, when items are needed in any other area, a known machine readable coded label can be placed on each item, or on its container, etc., and the items can be placed on a conveyor 20. Known sensor means (not shown) are located at predetermined locations along the conveyor path 20 and used to read the coded labels, and determine through known techniques the intended destination of each item and which diverters need to be activated at an appropriate time to properly route each item to its intended destination. Generally these sensors are placed at or before each location where an item may leave its present path along the conveyor 20 to be placed into a chute, storage bin or pick face, etc. These techniques are well known techniques in the art to automatically route items along an automatic conveyor 20.

It is noted that the machine readable label associated with each item on the conveyor 20 can also advantageously have human readable information printed on it so that the system operators and other personnel can monitor and double check the operation of the system.

The conveyor 20 can be of the tray type conveyor, with sensors located at various appropriate locations along its path, and known diverters to controllably eject items from the conveyor trays at appropriate times and positions along the conveyor path.

As depicted in FIG. 1, a single main conveyor 20 can be used to make all transfers between different locations, or separate conveyors can be used if desired between some locations. As indicated by broken lines in FIG. 1, in some systems it may be advantageous to have a first separate conveyor means 40 moving partially assembled orders, for example, from one picking area 11 to another picking area 12, and/or a second separate conveyor means 41 for moving completely assembled orders directly to the shipping area 13 rather than reintroducing a assembled or partially assembled order onto the main conveyor 20. In the case of a single master conveyor 20, an item or box of items can be placed back on the conveyor 20 with an appropriate machine readable label, and it will travel along on the conveyor 20 until one of the sensors determines that it should be diverted to a side path conveyor 22-31, or into a chute, etc. As depicted, the all side path conveyors 22-31 can be arranged so that they lead back to the main conveyor 20, and the main conveyor 20 would then be arranged such that it travels in a circuitous route so that it returns to its starting position after making a complete cycle. Thus, items can be routed from any area within the warehouse to any other area within the warehouse by means of a single conveyor 20.

Although goods may be transferred between the various operations, the ultimate destination of the goods is in an assembled order with goods for one customer assembled at the shipping area 13.

The picking areas 11 and 12 can be more fully understood with combined reference to FIG. 2 and FIG. 3.

As depicted in FIG. 2 and FIG.3, the prime pick area 11 and secondary pick area 12 can be located interiorly of a "loop" of the main conveyor 20, such that the main conveyor 20 travels around a peripheral portion of the pick areas 11 and 12.

Both pick areas 11 and 12 can generally comprise elongated central walkways 50 and 51, with a horizontal row, or other series or set, of individual sloping chutes or bins 52 comprising multiple pick faces on both elongated side of the walkways 50 and 51. The bins 52 have lower end portions 53 adjacent to the walkways 50 and 51, and opposed upper end portions 54 displaced laterally from the walkways 50 and 51, and are generally constructed to be long (or deep) enough to contain multiple ones or multiple cartons of various warehoused items or sku's.

The slope of the bins 52 is selected to cause items deposited at the upper portion 54 of the bins 52 to slide to the lower portion 53 of the bins under gravity feed, but the slope cannot be so great that items slide too fast, lest items be damaged, shoot out of the bin, etc. Picking from the bins 52, however, is made more efficient and easier at greater slopes than is optimal for feeding and stocking the bins 52. In order to reduce the disadvantages of such trade-offs, the bins 52 have self adjusting lower portion extensions 53 to improve picking.

Figure 4:
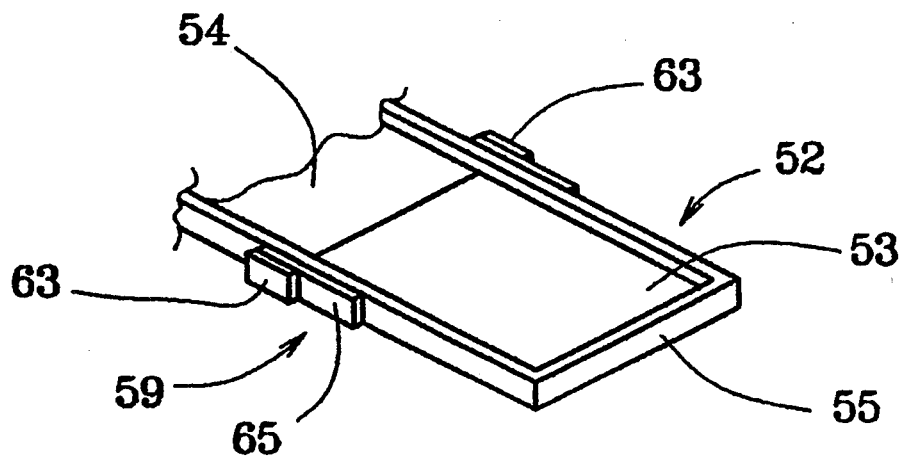
FIG. 4 is a perspective view of the lower end of a pick face for use with the system of FIG. 1.
Figure 5:
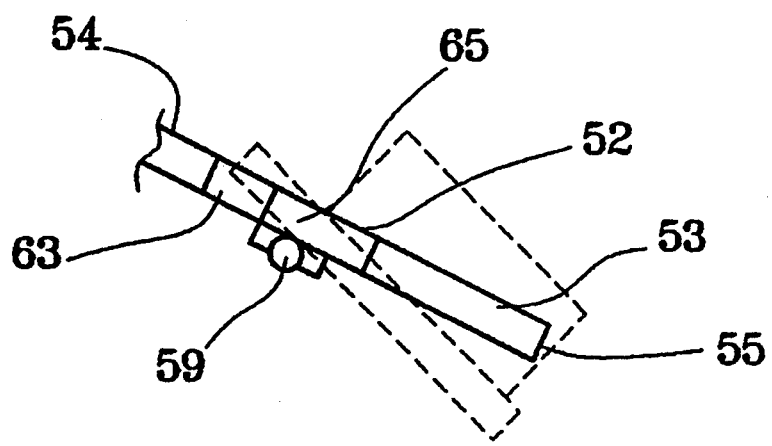
FIG. 5 is a side view of the pick face of FIG. 4.

As can best be seen in FIG. 4 and FIG. 5, the lower portion extensions 53 of each bin 52 is pivotally attached to the upper portion 54 of the bins 52 by means of a hinge 59. Struts 65 are rigidly attached to both sides of the lower portion 53 of the bins 52 below the point of the hinged pivotal attachment of the lower portion 53 and upper portion 54. The struts 65 extend generally along and in the same direction as the respective sides of the lower portion 53 of the bin 52, upwardly and beyond the point of pivotal attachment of the lower portion 53 to the upper portion 54, but clear and free of interference with the sides of the upper portion 54 of the bin 52. A counter balance weight 63 is attached to the upper end of each strut 65 at the outer sides thereof. Each of the lower portions 53 of the bins 52 have a generally upward extending flange means 55 at the bottom most part of its lower end portion 53 to stop items therein and prevent them from falling out.

The upper portion 54 of the bins 52 is angled downwardly at a first slope or angle of declination such that items deposited in the bins 52 at their upper portion 54 slide to the lower portion 53 thereof under gravity feed. As can best be seen in FIG. 5, the operation of the bins 52 is such that with nothing in a lower portion 53 of a bin 52, the lower portion 53 of the bin 52 is aligned with the upper portion 54 of the bin 52 at the same angle of declination under a torque force influence of the counterbalance 63 operating on the lower portion 53 of the bin 52. The weight and position of the counterbalance 63 is selected in conjunction with the length dimension of the strut 65 such that the torque produced thereby on the lower portion 53 of the bin 52 is slightly greater than the torque required to bring the angular declination of the lower portion 53 of the bin 52 into alignment with the upper portion 54 of the bin 52. Thus, when a carton, sku, etc., is on the lower portion 53 of the bin 52, the lower portion 53 of the bin 52 pivotally drops to a steeper angle of declination than the upper portion 54 of the bin 52, but with nothing on the lower portion 53 of the bin 52, the effect of the counterbalance 63 is to decrease the slope of the lower portion extension 53 of the bins 52, and the lower portion 53 of the bin 52 becomes angularity aligned with the upper portion 54. At this steeper angle of declination, the pick face is made more open for picking without necessitating the same steeper angle of declination for the upper portion 54 of the bin 52. A spring mechanism or other equivalent means could also be used.

Referring back now to FIG. 3, the bins 52 can be arranged in multiple levels to minimize the space required to contain all of the bins 52. Two levels are depicted. In this embodiment of the invention, the bins 52 comprise an upper level 56 of bins 52 and lower level 57 of bins 52, one set above the other at a higher vertical elevation, thus comprising multiple paired sets of bins 52, each pair being comprised of an upper bin 56 and a lower bin 57.

An individual chute 60 for each paired set of bins 52 is located at the upper ends 54 of each of the paired sets of bins 52. The chutes 60 are inclined downwardly between an upper infeed end portion 62 and a lower outfeed end portion 61, with the lower end 61 proximate the upper ends 54 of a corresponding set of paired bins 52, and with the upper end 62 proximate the conveyor 20. The lower portion 61 of the chute 60, itself comprising a smaller second chute, is pivotally attached to the upper portion 62 of the chute 60 by means of a hinge 70 to comprise a hinged floor, and is selectively operable, by means of the pivotal hinged attachment and known actuation means, to align with either a corresponding lower level bin 57 or upper level bin 56 so that the automatic main conveyor 20, in conjunction with its tilting type diverting mechanism and the chutes 60, can direct and deposit items or boxes of items into either the lower level bins 57 or the upper level bins 56 to stock them under automatic control of the operating system depending on the position of the lower portion 61 of the chute 60. The hinged floor mechanism of the lower portion 61 of the bins 52 can be operated by known means, such as pneumatic, electrical, hydraulic, etc., under automatic control.

The upper ends 62 of the chutes 60 are located proximate the main conveyor 20, such that at an appropriate time, under control of the operating system, the tilt tray mechanism of the conveyor 20 can be activated to slide an item off of the tray and into a desired chute 60. Depending on the angular position of the lower portion 61 of a particular chute 60, the item is directed to the appropriate upper level bin 56 or lower level bin 57.

The actual physical layout of both pick areas 11 and 12 may be identical, except possibly for their respective physical sizes, although the utilization and functioning of each is different, as will be described later.

A first separate conveyor 40 is depicted at one end 71 of the prime pick area 11, so that when all picking on a particular order is completed in the prime pick area 11, with the items assembled into a container for example, the container with the items for that particular partially assembled order can be sent to the secondary pick area 12 (if necessary) without placing it onto the main conveyor 20, although it could be placed on the main conveyor to be taken to the secondary pick area 12.

If the order is completed with the items in the primary pick area 11, the container with that order can be sent directly to the shipping area 13, but if additional items are required from the secondary pick area 12 to complete the order, the container is sent to the secondary pick area 12 for further picking.

Alternatively, the conveyor 40 from the prime pick area 11 to the secondary pick 12 area can be eliminated and the pickers can physically take the basket to the secondary pick area 12 to complete the picking if necessary.

In order to further optimize space utilization and conveyor access, there are two banks of chutes 60 and bins 52, one on either elongated interior side of the main conveyor 20 such that items can be deposited into either bank of chutes 60 from the main conveyor 20.

The primary pick area 11 is used for the items or sku's to be picked during a pick period that are the most active, high volume movers. As noted above, in many, if not all warehousing operations, it turns out that a somewhat small number of the total number of sku's (e.g. "20%") in the warehouse represent the largest part of the items shipped. In general these items can be the same during each pick period, but more typical is the case where the particular items making up the high volume class will be different, at least somewhat, for any particular time period than they were for a previous period. This high volume primary pick area 11 is designed to accommodate these high volume movers. In order to accommodate the variance in the composition of the high volume movers, the bins 52 in the prime pick area 11 are dynamically assigned to items for each picking period. That is, a particular bin 52 may have, and likely will have, a different item in it for a present picking period than it had in the previous picking period. The picker, instead of being directed by his pick slip to pick a particular described item, is directed to pick the item in a particular designated bin. As a double check to the system, the pick slip directing the picking may also have a designation of the item that is supposed to be located in that bin during this pick period, but it is not required.

The prime pick area 11 is used for picking high volume sku's during a pick period, and stocked with such items prior to the pick period, and therefore the majority of all picking can be performed in this smaller pick area 11, hence reducing the time it takes to actually move around to gather the majority of the items during a pick period, as opposed to traveling around a larger picking area containing all items in inventory.

The secondary picking 12 area can comprise a series of bins 64, possibly identical to the bins 52 in the primary pick area 11, or some other type of pick faces where a predetermined portion of all sku's in inventory are kept for picking. In general, these bins 64 can be dedicated to their particular product or item. That is, the same item is always in the same bin. As the goods are depleted in any individual one of the bins 64 due to shipments to customers, the supply of goods in such bin(s) 64 is replenished from bulk storage 10 on a regular updated basis.

There are several options for assigning items to the secondary pick area 12. In general it has been found most efficient to have a representative stock of all items in inventory in this secondary pick area 12. That is, there will be a pick face assigned in the secondary pick area 12 for all items in inventory, but not all of the stock will be located there. Thus, for example, there may be 100 boxes of a particular item in total inventory, but only two boxes are kept in the secondary pick area 12. Therefore, all orders could be gathered totally from this secondary pick area 12. However, because it only contains a portion of the total inventory, the physical space involved in traveling it to gather the required items is less than the space required to be traveled to pick the same items from bulk inventory 10, and therefore the time to travel around and collect the items will be reduced.

As a second alternative, the secondary pick area 12 may be assigned to contain some of all items in inventory except for the very slow movers. This would result in yet a smaller area assigned for the secondary pick area 12, but would necessitate going to the bulk storage area 10 (or a third picking area) to gather the very slow moving items.

Thus, for any orders that require items that are not currently assigned to or otherwise cannot be picked from the prime picking area 11, these items can then be picked from the secondary picking area 12, or a third picking area, or from bulk storage 10 as required.

A second separate conveyor 41 can be located at the end of the secondary picking area 12 for transporting completely assembled orders to the shipping area 12. Alternatively, the completed orders can be placed on the main conveyor 20 for transportation to the shipping area 13.

It is noted that a secondary pick area 12 in addition to bulk storage 10 is not necessary for various aspects and applications of the invention, and the secondary pick area 12 may in fact advantageously comprise the bulk storage area 10 for some applications.

It is desirable in most applications to have "full cartons only" in the primary picking area 11. In these cases, the total number of items of any sku currently assigned to the primary picking area will thus be less than or equal to the total number of items of such sku needed during a pick period, and efficiency is improved if full cartons only are placed in these bins 52 since stocking and restocking time can be reduced. Thus for example, if a full carton of one particular high volume item for this picking period contains 20 units, and the demand for items is 24 units during the period, then one carton will be placed in some bin 52 of the primary picking area 11, and 4 units will be picked from the secondary picking area 12 (or from bulk storage 10). In addition, it is contemplated that some operating systems will be able to keep track of partially filled cartons, or even individual ones of the items assigned to the sku's, such that some or all of the primary pick faces can be filled with the exact number of items needed for a pick period.

Further, it is noted that some sku's may be assigned to more than one pick face of the primary pick area 11 during a pick period. Thus, for example, if a particular sku has a demand of 20 full cartons during a pick period, and a pick face only has room for 5 cartons maximum, then that sku will be assigned to 4 pick faces in the primary pick area 11.

In operation, picking is performed in somewhat short, regularly recurring pick periods, e.g., in the range of approximately 20 minutes to approximately 2 hours. In many applications, the efficiency of the system is improved in the shorter range of pick period duration.

Prior to a later pick period, known techniques or means are used to determine which orders will be picked during that period, which sku's will be needed, the number of items of each sku that will be needed, and which sku's, on a descending basis, will have the highest demand during that pick period. Also, pick slips are prepared before the start of a pick period to specify the items needed for each order during the period, and specify the appropriate pick face fox each item during that pick period. In larger warehouse operations, these can be done by computer techniques, but they could be done manually as well.

The primary pick faces are divided into a first and second subset of primary pick faces, namely, in this case, a subset comprising the upper bins 56 and a subset comprising the lower bins 57. Further, in the primary pick area 11, picking is divided into and performed in rotational or alternating pick periods, such that during a first period only the upper bins 56 are operated for active picking and used to pick from, and during the next period, only the lower bins 57 are operated for active picking and used to pick from. Thus, each category of bins 56 and 57 has an alternating active utilization period, and a alternating "idle" or inactive utilization period. During the period when a particular group of bins 56 or 57 is idle, they are not operated for active picking, surplus goods can be removed if necessary (although there should be no surplus goods if the system is operating properly), and the bins 56 or 57 can then be stocked with the appropriate items for their next alternating active period for that group of bins when they will again be used for active picking. Thus, picking can be performed on a continuous alternating or rotational basis, in the same area without waiting for the bins 56 or 57 to be stocked.

It is noted that the actual percentage of sku's that comprise the majority of the items shipped during a pick period will depend on the application, and the nature of the business, and the particular products being warehoused. In some cases it may be that as much as approximately 50% of the sku's make up the majority of the items being shipped, but more typically, a smaller percentage of the sku's, i.e., 20% or less will comprise 80% to 90% or more of the items shipped. As the percentage of the sku's comprising the majority of the items shipped approaches the levels of 75% or more, some advantages of the system are reduced. Thus, the total number of active pick faces in the primary pick area 11 during a pick period should correspond to less than about 50% of all of the different warehoused sku's, and a greater benefit can be realized in warehouse operations where the high volume items during pick periods comprise approximately 20% or less of the warehoused sku's, and the total number of active pick faces in the primary pick area thus corresponds in number to less than about 20% of the different warehoused sku's.

It is noted that the inventive aspects described here can be used with many different types of warehouse systems, and various modifications can be made to the described system while still taking advantage of its inventive concepts and benefits.

There could be 3 or more levels of pick faces in the picking areas.

Pick periods may be alternated between 3 or more groups of primary pick faces.

The different groups of pick faces comprising the primary pick area could be side by side rather than at different elevations. In fact, they could be in completely different locations within the warehouse depending on the application.

The selection of items for the primary pick area may be fixed, e.g., only the top 20% (or 15%, etc.) even if there are still pick faces in the primary pick area available, or the primary pick area may be designated to take as many full cartons of the top moving sku's per pick period on a descending basis as there are pick faces available, until all of the pick faces in the primary pick area have been exhausted, even if that means having a greater percentage of the total number of sku's or a lesser percentage of the total number of sku's for a particular pick period than may be typical for the operation. The latter is the preferred case.

As will be appreciated by those skilled in the art, maximum benefits will be derived from the invention when used with a computer directed automated system, but the inventive aspects are applicable to partially or non-automated operations as well.

The invention results in improved efficiency, reduced operating costs, and better utilization of space in warehouse operations.

Having described the invention, it is claimed:

1. A method of consolidating from all different warehoused sku's different selected ones of said sku's during predetermined short regularly recurring pick periods comprising the steps of:
   classifying warehoused items according to a predetermined sku designation;
   dividing pick areas into two sets of pick faces;
   determining by sku designation all of the different items needed for all orders to be picked during an individual subsequent pick period;
   determining the individual total number of each of the different needed items according to their sku designation, and determining in descending order the sku's with the highest total number needed to be picked for all orders during such subsequent pick period;
   assigning and stocking the sku's with the greatest total number needed to be picked during such subsequent pick period into a first set of primary pick faces having a maximum number of pick faces corresponding in number to less than approximately 50% of all different sku's warehoused, with each pick face containing only one type of item;
   generating pick slips identifying by individual orders the items needed to complete each such order and designating the individual pick faces containing each of such items;
   picking items for an order from the first set of pick faces for items stocked in the first set of pick faces;
   stocking a second set of pick faces, in addition to the first set, with items that are not currently stocked in the primary pick faces;
   picking from the second set of pick faces all items needed for an order that cannot be picked from the first set of primary pick faces;
   re-assigning sku's to and re-stocking the first set of pick faces for the next successive pick period with sku's having the greatest total number needed to be picked during such next successive pick period.

2. The method of claim 1 which further comprises the step of assigning and stocking the highest volume items to be picked during a next pick period into a first set of primary pick faces having a maximum number of pick faces corresponding in number to less than approximately 20% of the total number of sku's warehoused, with each pick face containing only one type of item.

3. The method of claim 1 or 2 which further comprises the steps of:
   dividing the first set of primary pick faces into at least a first and second subset of primary pick faces;
   dividing the pick periods into at least first and second alternating pick periods, each lasting between approximately 20 minutes to approximately 2 hours in duration, wherein during the first alternating pick period the first subset of pick faces is in an active pick period and the second subset of pick faces is in an inactive period, and during the second alternating pick period the second subset of pick faces is in an active pick period and the first subset of pick faces is in an inactive period.

4. The method of claim 3 which further comprises the steps of;
   picking items from a subset of the first set of pick faces during its active pick period and restocking a subset of the first set of pick faces during its inactive period.

5. The method of claim 4 which further comprises the step of stocking individual ones of the first set of pick faces with a number of particular sku items not in excess of the total number of such particular item needed of each such item during the next active pick period.

6. The method of claim 4 which further comprises the step of stocking individual ones of the first set of pick faces with full cartons only.

7. The method of claim 4 which further comprises the steps of automatically stocking the first set of pick faces by means of automatic conveyor means and automatic diverter means.

8. The method of claim 7 which further comprises the steps of determining the most active items for the next pick period, stocking the primary pick faces, and preparing the pick slips by a computer based system.

9. The method of claim 8 wherein the steps of automatically stocking the first set of pick faces by means of automatic conveyor means and automatic diverter means utilizes a tray type conveyor and diverter means and inclined chute means to direct items into appropriate pick faces comprising inclined bins.

10. The method of claim 3 which further comprises the step of stocking individual ones of the first set of pick faces with a number of particular items not in excess of the total number of such particular items needed of each such item during the next active pick period.

11. The method of claim 3 which further comprises the step of stocking individual ones of the first set of pick faces with full cartons only.

12. The method of claim 3 which further comprises the step of stocking individual ones of the first set of pick faces with the number of particular items of that sku equal to the total number of such particular items of that sku needed during the next active pick period.

13. The method of claim 1 or 2 which further comprises the step of stocking individual ones of the first set of pick faces with a number of particular items not in excess of the total number of such particular items needed of each such item during the next active pick period.

14. The method of claim 1 or 2 which further comprises the step of stocking individual ones of the first set of pick faces with full cartons only.

15. The method of claim 1 or 2 which further comprises the step of stocking individual ones of the first set of pick faces with a number of particular items equal to the total number of such particular items needed of each such item during the next active pick period.

16. The method of claims 1 or 2 which further comprises the step of automatically stocking the first set of pick faces by means of automatic conveyor means and automatic diverter means.

17. The method of claim 16 which further comprises the steps of determining in descending order the sku's with the highest total number needed to be picked for all orders during a subsequent pick period, stocking the primary pick faces, and preparing the pick slips by a computer based system.

18. The method of claim 17 which further comprises the steps of using a tray type conveyor and diverter means and having inclined chute means to direct items into appropriate pick faces comprising inclined bins.

* * * * *